Dec. 13, 1927. Re. 16,818

C. F. JENKINS

PNEUMATICALLY CONTROLLED LIGHT VALVE

Original Filed Aug. 30, 1922

Inventor

CHARLES FRANCIS JENKINS.

By Paul Carpenter

Attorney

Reissued Dec. 13, 1927. Re. 16,818

UNITED STATES PATENT OFFICE.

CHARLES FRANCIS JENKINS, OF WASHINGTON, DISTRICT OF COLUMBIA, ASSIGNOR TO JENKINS LABORATORIES, A CORPORATION.

PNEUMATICALLY-CONTROLLED LIGHT VALVE.

Original No. 1,525,548, dated February 10, 1925, Serial No. 585,316, filed August 30, 1922. Application for reissue filed January 10, 1927. Serial No. 160,317.

This invention relates to details of apparatus for the transmission of pictures-by-radio, and has for its principal object the valvelike control of a beam of light in a more elastic manner than has heretofore been proposed.

Figure 1:
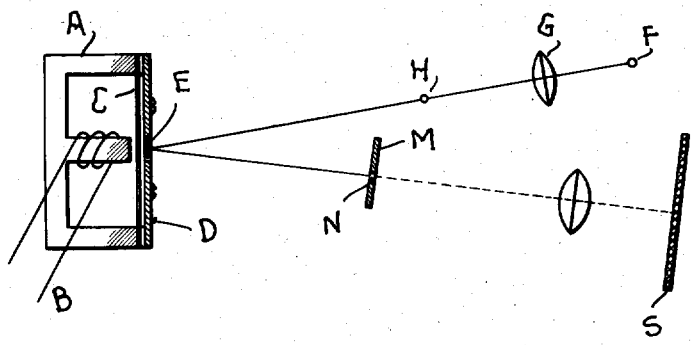
Figure 2:
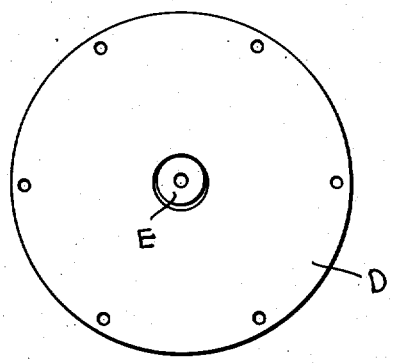

The invention is diagrammatically illustrated in the accompanying drawings Figure 1 and Figure 2 (the latter a detail view) in which A is a cup-shaped magnet, with a wire coil B encircling a central member extending upward from the bottom thereof. C is an elastic iron diaphragm; D a stiff iron disc adjacent to the diaphragm, both the disc and the diaphragm being fixed to the rim of the cup-like magnet. The disc D has an opening therein in which is supported a thin iron valve member slightly smaller than the opening. This valve is held by magnetic attraction, with the edge against the edge of the opening in the disc D, and in the same general plane by the same force. Upon the valve a small reflecting spot E′ has been polished or a small mirror mounted, from which light coming from a source F is reflected to the mask M. The shadow of H (an opaque body) is made to fall upon the aperture N by adjustment of the various parts when at rest, consequently no light can pass through the aperture to the photographic plate S.

When, however, fluctuating current from some outside source flows through the coil B the diaphragm is vibrated, with the result that the density of the air between the diaphragm and the disc D is increased and decreased alternately, causing the valve to follow the movement of the diaphragm, lying as it does between the constant density of the air outside and the changing density of the air imprisoned between the diaphragm and disc.

Obviously the movement of the valve imparts a corresponding movement to the light (and shadow) from the mirror surface as it oscillates in greater or lesser amplitude, and consequently more or less light passes through the aperture N as the shadow of H moves more or less from over the aperture. And as the volume of light admitted through the aperture N corresponds to the amplitude of the valve vibration, and the latter results directly from the varying strength of the current in the coil B, it follows that the light value passing through N corresponds directly to the current strength in coil B. Consequently the photographic plate exposure value at any particular movement is practically proportional to the current strength.

The operation of the valve by means of the air imprisoned thereunder is not only convenient and simple, but provides a certain elasticity of connection which it has been found adds materially to the certainty and smoothness of action of the light beam, while at the same time the magnetic grip of the valve disc edge prevents the chattering which often results from a pin hinge action where high speeds are involved.

It is obvious that with the shadow of the opaque body lying over the opening in the mask M, and the mask illuminated on either side of the opening, that the movement of the shadow in either direction across the opening permits light to pass through the opening. If the shadow moves far enough to wholly uncover the opening the light falling on the plate S will be of maximum strength, while if it moves a lesser distance a lesser amount of light passes the opening and the plate is exposed correspondingly less. Hence, the amplitude of vibration of the shadow determines the actinic value (strength) of the light passing the opening at any particular moment considered. And as the amplitude is proportional to the current strength it follows that the photographic values are proportional to the current values.

What I claim is:

1. In apparatus of the class described, a source of light, and a pneumatically-actuated valve to permit air to pass it in combination with means for controlling the effective value of a beam of light from said source, said means including a light reflecting surface carried by the valve in the movements thereof.

2. In apparatus of the class described, a source of light, a diaphragm vibrated by a fluctuating electrical current, a leaky valve adjacent to the diaphragm and actuated by air lying therebetween, and means operated by said valve for controlling the effective value of a beam of light from said source, said means including a light reflecting surface carried by the valve in the movements thereof.

3. In apparatus of the class described, the combination of a vibrating mirror, a light source, means for directing the light from the source onto said mirror, an opaque member smaller than the field of the light source, and located between the light source and the mirror, a receiving surface upon which the light is reflected from the mirror, and an apertured mask between the receiving surface and the mirror.

4. In apparatus of the class described, the combination of a vibrating mirror, a light source, means for directing the light from the source onto said mirror, an opaque member smaller than the field of the light source, and located between the light source and the mirror, a receiving surface upon which the light is reflected from the mirror, an apertured mask between the receiving surface and the mirror, and means for vibrating the mirror.

5. In apparatus of the class described, the combination of a vibrating mirror, a light source, means for directing the light from the source onto said mirror, an opaque member smaller than the field of the light source, and located between the light source and the mirror, a receiving surface upon which the light is reflected from the mirror, an apertured mask between the receiving surface and the mirror, and pneumatic means for vibrating the mirror.

6. In apparatus of the class described, the combination of a vibrating mirror, a light source, means for directing the light from the source onto said mirror, an opaque member smaller than the field of the light source, and located between the light source and the mirror, a receiving surface upon which the light is reflected from the mirror, an apertured mask between the receiving surface and the mirror, and magnetic actuated pneumatic means for vibrating the mirror.

7. In apparatus of the class described, the combination of a vibrating mirror, a light source, means for directing the light from the source onto said mirror, an opaque member smaller than the field of the light source, and located between the light source and the mirror, a receiving surface upon which the light is reflected from the mirror, an apertured mask between the receiving surface and the mirror, and a mirror supported in place by magnetic means.

8. In apparatus of the class described, a diaphragm vibrated by a fluctuating electrical current, a valve adjacent to the diaphragm and actuated by air lying therebetween, means operated by said valve for controlling the effective value of a beam of light, and means for splitting the beam of light into light areas.

9. In apparatus of the class described, a freely-moving member held at one edge by magnetic attraction to a fixed member, in combination with a photographic plate, means mounted on said moving member for controlling the effective value of a light beam impinging on said photographic plate, an apertured mask between the moving member and the photographic plate, and an opaque member interposed in the light beam in such position as to cast a shadow upon the aperture in said mask.

10. In apparatus of the class described, the combination of a source of light of constant intensity, means for forming a tubular beam of light having a dark area from said source and directing it towards a light-receiving surface, a light-intercepting screen having an aperture substantially the same size as the dark area within said beam, said screen being interposed between said source and said surface in a position to normally cut off all the light, and means for shifting said beam with respect to said screen to permit varying amounts of light to pass to said surface through said aperture.

11. In apparatus of the class described, the combination of a source of light of constant intensity, means for forming a beam of light having a dark section and directing it towards a light-receiving surface, a light-intercepting screen having an aperture substantially the same size as the dark area of said beam, said screen being interposed between said source and said surface in a position to normally cut off all the light, and means for shifting said beam with respect to said screen to permit varying amounts of light to pass to said surface through said aperture.

12. In an apparatus of the class described, a source of light and a pneumatically actuated leaky valve magnetically supported to form a connecting hinge, in combination with means operated by the valves for controlling the effective value of a beam of light from said source.

In testimony whereof I affix my signature.

CHARLES FRANCIS JENKINS.